United States Patent
Schmid (10) Patent No.: US 10,744,955 B2
(45) Date of Patent: Aug. 18, 2020

(54) MOTOR VEHICLE

(71) Applicant: Bayerische Motoren Werke Aktiengesellschaft, Munich (DE)

(72) Inventor: Bernhard Schmid, Unterfoehring (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/513,946

(22) Filed: Jul. 17, 2019

(65) Prior Publication Data
US 2019/0337465 A1 Nov. 7, 2019

Related U.S. Application Data

(63) Continuation of application No. PCT/EP2018/051714, filed on Jan. 24, 2018.

(30) Foreign Application Priority Data

Feb. 10, 2017 (DE) .................... 10 2017 202 114

(51) Int. Cl.
*B60R 11/02* (2006.01)
*B60J 5/04* (2006.01)
(Continued)

(52) U.S. Cl.
CPC ......... *B60R 11/0241* (2013.01); *B60J 5/0413* (2013.01); *B60J 5/0493* (2013.01);
(Continued)

(58) Field of Classification Search
CPC ......... B60R 11/0241; B60R 2011/0021; B60R 2013/0287; B60R 13/0243; B60R 11/02;
(Continued)

(56) References Cited

U.S. PATENT DOCUMENTS 7,062,300 B1 * 6/2006 Kim, II ............... B60R 11/0241
379/454
2002/0125734 A1 * 9/2002 Pokorzynski ....... B29C 44/1257
296/146.7
(Continued)

FOREIGN PATENT DOCUMENTS

DE 10 2008 008 128 A1 8/2009
DE 10 2013 014 179 A1 4/2014
(Continued)

OTHER PUBLICATIONS

International Search Report (PCT/ISA/210) issued in PCT Application No. PCT/EP2018/051714 dated May 2, 2018 with English translation (seven (7) pages).
(Continued)

*Primary Examiner* — Tuan D Nguyen
(74) *Attorney, Agent, or Firm* — Crowell & Moring LLP (57) ABSTRACT

A motor vehicle has a mounting device for a smartphone provided on a door panel. A housing of a receiving device of the mounting device is simultaneously used as the door handle, and the housing of the receiving device has operating elements for locking and unlocking a door lock and/or operating elements for locking and unlocking a door brake of a side door.

15 Claims, 5 Drawing Sheets

(51) Int. Cl.
  *B60R 11/00* (2006.01)
  *B60R 13/02* (2006.01)
(52) U.S. Cl.
  CPC .......... *B60R 2011/0021* (2013.01); *B60R 2011/0071* (2013.01); *B60R 2011/0084* (2013.01); *B60R 2011/0085* (2013.01); *B60R 2013/0287* (2013.01)
(58) Field of Classification Search
  CPC ..... B60R 2011/0071; B60R 2011/0084; B60R 2011/0085; B60J 5/0413; B60J 5/0493; E05B 85/12
  See application file for complete search history.

(56) References Cited

U.S. PATENT DOCUMENTS

| | | | |
|---|---|---|---|
| 2009/0199480 A1 | 8/2009 | Ehrhard | |
| 2009/0296006 A1* | 12/2009 | Campbell | B60R 11/02 348/837 |
| 2014/0132030 A1* | 5/2014 | Usami | B60R 13/0243 296/153 |
| 2016/0129851 A1 | 5/2016 | Werner | |
| 2016/0237723 A1* | 8/2016 | Burd | E05C 19/009 |
| 2017/0274940 A1* | 9/2017 | Povinelli | B60R 5/041 |

FOREIGN PATENT DOCUMENTS

| | | |
|---|---|---|
| DE | 10 2013 202 932 A1 | 8/2014 |
| DE | 10 2015 009 994 A1 | 2/2016 |
| DE | 10 2014 016 570 A1 | 5/2016 |
| JP | 2009-269535 A | 11/2009 |

OTHER PUBLICATIONS

German-language Written Opinion (PCT/ISA/237) issued in PCT Application No. PCT/EP2018/051714 dated May 2, 2018 (six (6) pages).

German-language Search Report issued in counterpart German Application No. 10 2017 202 114.4 dated Oct. 26, 2017 with partial English translation (13 pages).

* cited by examiner

Fig. 2

MOTOR VEHICLE

CROSS REFERENCE TO RELATED APPLICATIONS

This application is a continuation of PCT International Application No. PCT/EP2018/051714, filed Jan. 24, 2018, which claims priority under 35 U.S.C. § 119 from German Patent Application No. 10 2017 202 114.4, filed Feb. 10, 2017, the entire disclosures of which are herein expressly incorporated by reference.

BACKGROUND AND SUMMARY OF THE INVENTION

The invention relates to a motor vehicle with at least one side door, wherein the respective side door has a door body which is provided with a door panel which faces a vehicle interior, and wherein a side window which can be lowered into the door body is provided above a door window sill of the door body.

DE 102013202932 A1 discloses a motor vehicle of the type in question which, below a door window sill in a door panel of a vehicle door, has a displaceable receiving device for a communications device or data processing device, for example a smartphone, between two raised regions extending into the vehicle interior.

The receiving device can be displaced along guide rails in order to improve the arrangement of the communications device or data processing device for a user who is on a vehicle seat adjacent to the side door.

The smartphone is arranged in a cavity of a receiving part of the receiving device and is clamped between the receiving part of the receiving device and a clamping part adjacent thereto of the receiving device. By holding the smartphone between the two parts of the receiving device, not only is dropping out prevented, but also slipping of the smartphone is avoided. Slipping of the smartphone could lead to rattling or to other annoying noises.

The guide rails for the receiving part of the receiving device and the clamping part, which is adjacent thereto in the closed position, of the receiving device are designed as double rails. The two parts of the receiving device can be displaced separately from each other by the double rails.

It is the object of the invention to provide a motor vehicle with a device for holding a communications device and/or data processing device on a door panel of a side door, said holding device having a plurality of functions.

A motor vehicle according to the invention has at least one side door with a door body, the door body is provided with a door panel which faces a vehicle interior. A side window which can be lowered in the door body is provided above a door window sill of the side door. A displaceable holding device which has a receiving device and a clamping device which is connectable thereto is provided in an intermediate space between two protruding door panel sections.

A housing of the receiving device advantageously serves simultaneously as a door handle. Furthermore, the housing of the receiving device has operating elements for locking and unlocking a door lock and/or operating elements for locking and unlocking a door brake of the side door.

In an advantageous embodiment, a bodywork of the motor vehicle contains at least one door cutout opening which is substantially bounded in the vertical direction by two bodywork pillars. A side door is arranged in the respective door cutout opening.

The door panel advantageously has an upper, protruding door panel section below the door window sill and a lower, protruding door panel section spaced apart therefrom by an intermediate space.

In an advantageous embodiment, the receiving device and the clamping device of the holding device are displaceable via guide rails. The guide rails are formed in the upper door panel section and in the lower door panel section.

The receiving device advantageously has a section which protrudes into the vehicle interior at a predetermined inclination, and a section which is connected integrally thereto and is held in the guide rails.

The clamping device advantageously has a section protruding into the vehicle interior and a section guided in the guide rails. That section of the clamping device which protrudes into the vehicle interior has the same inclination as that section of the receiving device which protrudes into the vehicle interior.

In an advantageous embodiment, the holding device acting as a door handle is displaceable in a translatory manner in the direction of the guide rail by a drive device.

Advantageously, the holding device acting as a door handle has a pivoting device which is movable by a drive device and by which the holding device is reversibly pivotable from the position, determined by the guide rails, in the door panel into a position pivoted into the vehicle interior.

In an advantageous embodiment, the pivoting of the receiving device and of the clamping device connected thereto takes place at a respective end of the receiving device and of the clamping device, which end is spaced apart from that section of the receiving device which faces the vehicle interior or from the corresponding section of the clamping device.

A side door which is attached at the rear is advantageously provided with a control device which, during the opening of the side door automatically or by manual actuation, brings about fixing of the side door at a predetermined opening angle via the present door brake.

In an advantageous embodiment, a control device is provided which, automatically or by manual actuation on the holding device, brings about a translatory displacement of the holding device in the direction of the guide rails which are present from a front position into a rear position, or vice versa, as seen in the longitudinal direction x of the vehicle.

In an advantageous manner, a control device is provided which, alternatively or additionally, brings about pivoting of the holding device from the door-panel-side position into the pivoting position of the holding device, said pivoting position facing the vehicle interior.

In an advantageous embodiment, the actuation for unlocking or locking the door lock takes place electrically or mechanically.

An actuating device is provided on the holding device, advantageously in a gripping position, said actuating device, by being actuated, bringing about unlocking of the door lock.

In an advantageous embodiment, the housing has a reinforced frame.

In an advantageous manner, the drive for displacing and/or for pivoting the holding device and/or for locking and unlocking the door lock and/or for retaining the door brake in the predetermined door opening position takes place mechanically, electrically and/or pneumatically.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 5 is a sectional view corresponding to FIGS. 2 and 4, wherein

DETAILED DESCRIPTION OF THE DRAWINGS

Figure 1:
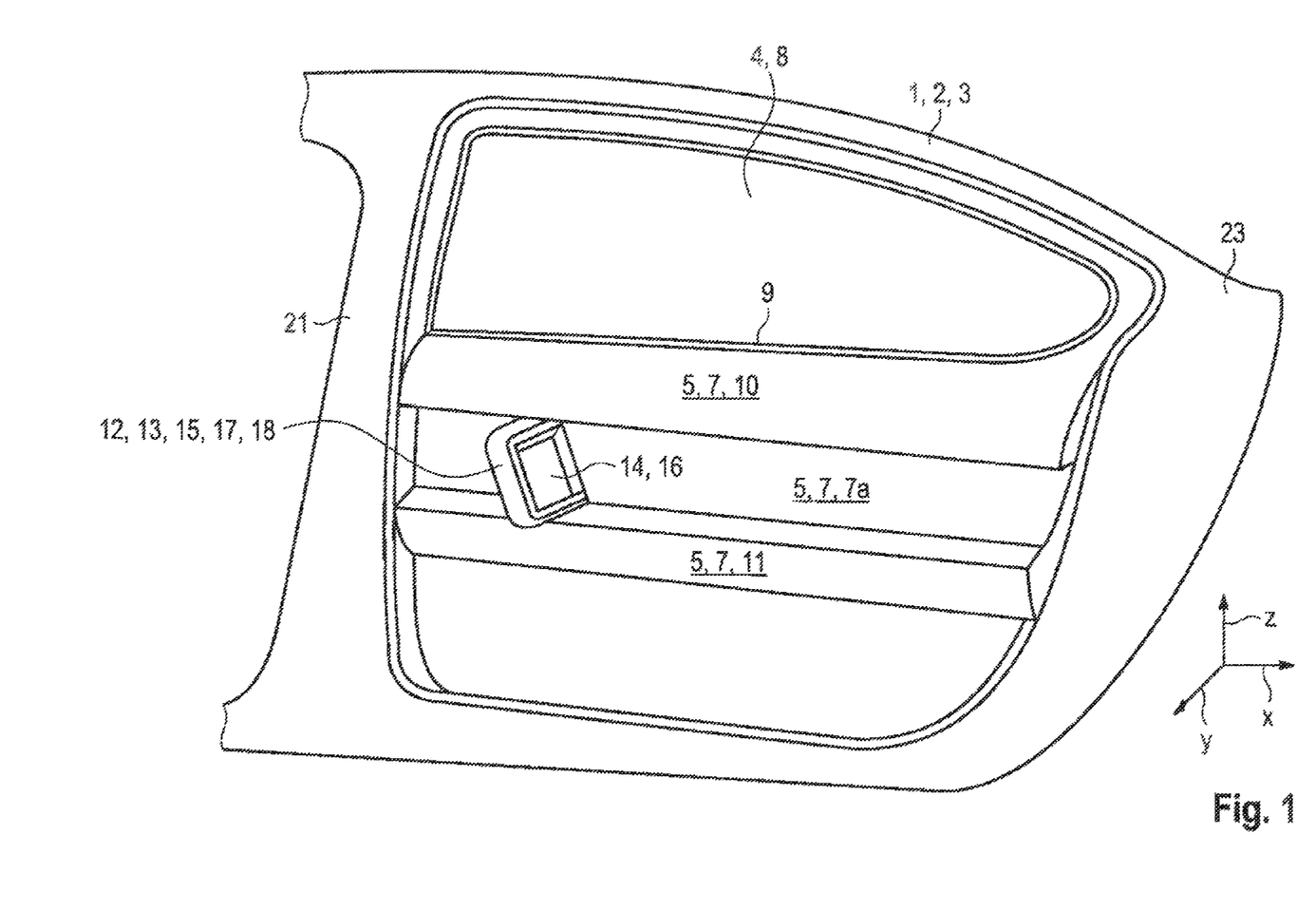
FIG. 1 is a perspective view of a rear side door which is arranged in a body cutout opening in a bodywork that has a holding device, which protrudes into a vehicle interior, for a smartphone, wherein the holding device is arranged displaceably in a door panel.

FIG. 1 shows a rear vehicle door or side door 4 arranged in a door cutout opening 3 in a bodywork 2 of a motor vehicle 1. The side door 4 has a door body 5. The door body 5 is covered with a door panel 7 facing a vehicle interior 6. A lowerable side window 8 is arranged above the door body 5.

An upper door panel section 10 protruding into the vehicle interior 6 extends below a door windowsill 9. A lower door panel section 11 protruding in the transverse direction y of the vehicle is spaced apart by a distance from the upper door panel section 10 protruding in the transverse direction y of the vehicle. A holding device 12 is arranged displaceably in an intermediate space 7a between the two protruding door panel sections 10 and 11.

The holding device 12 serves for holding a communications device or data processing device 16 (not illustrated specifically), called a smartphone below. The holding device 12 corresponds in design to the receiving device known from DE 10 2013 202 932 A1.

Figure 2:
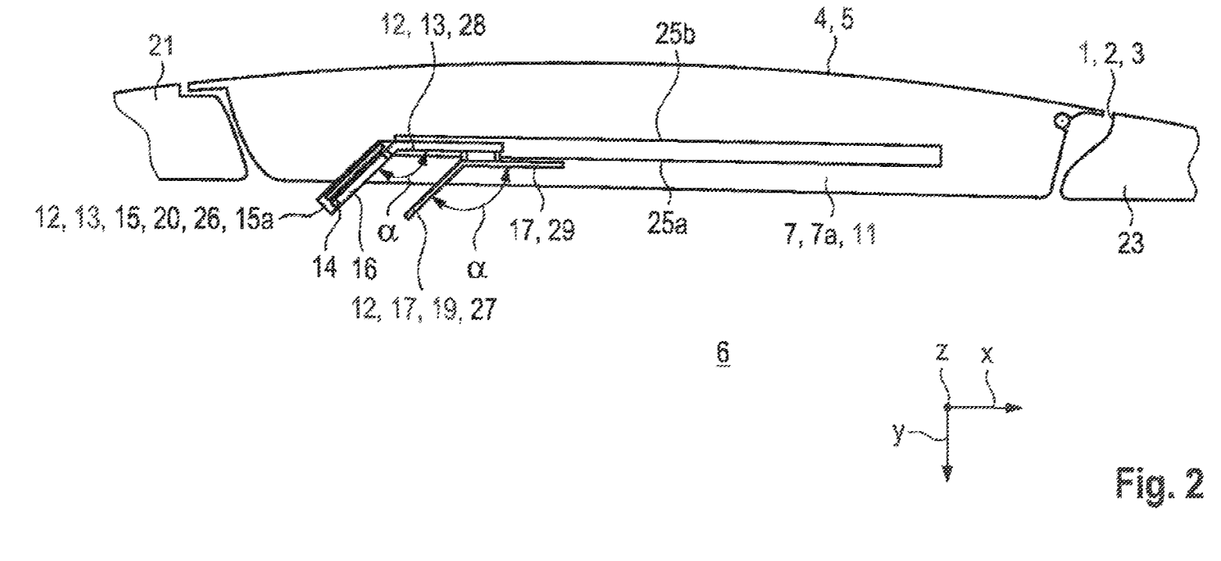
FIG. 2 is a sectional view from above, in which a receiving device of the holding device is in a front position and a clamping device of the holding device is spaced apart from the receiving device of the holding device in order to insert a smartphone into a cavity of the receiving device or to remove same from the cavity.

In the embodiment shown, the holding device 12 is constructed in two parts consisting of a receiving device 13 and a clamping device 17.

The receiving device 13 has a housing 15 with a cavity 14 for receiving the smartphone 16. In one embodiment, the housing 15 has a reinforced frame 15a, which is shown in FIG. 2.

The cavity 14 can be of cross-shaped design, and therefore the smartphone 16 can be arranged in a substantially vertical position and in a substantially horizontal position. "Substantially vertical" or "substantially horizontal" should be understood as meaning that the smartphone is arranged at an angle of between 5° and 40°, in particular between 10° and 30°, with respect to a vertical or horizontal position.

Furthermore, an angle α, which is shown in FIG. 2, is formed between an angled section 26 protruding into the vehicle interior 6 and a section 28 of the receiving device 13 extending parallel to the door panel 7. According to DE 10 2013 202 932 A1, the angle α is between 90° and 150°, in particular is approx. 130°.

By means of the substantially identical shape to the receiving device 13, the clamping device 17 has a section 27 protruding into the vehicle interior 6 and a section 29 extending parallel to the door panel 7. According to DE 10 2013 202 932 A1, the angle α between the angled section 27 protruding into the vehicle interior 6 and that section 29 of the clamping device 17 which extends parallel to the door panel 7 is between 90° and 150°, in particular is approx. 130°.

Furthermore, that section 26 of the receiving device 13 which protrudes into the vehicle interior 6 and that section 27 of the clamping device 17 which protrudes into the vehicle interior 6 are inclined by an angle with respect to the vertical direction. The angle can be, for example, between 0° and 30° and is, for example, approximately 14°.

The inclination leads to a smartphone 16 which is placed into the receiving device 13 facing obliquely upward with the display. As a result, the viewing angle for a user on the adjacent vehicle seat is improved since a user's head is above the door panel 7 and the user looks obliquely downward at the smartphone 16.

Furthermore, in one embodiment, a latching device (not illustrated) is provided in the housing 15 of the receiving device 13, said latching device permitting locking and releasing of the smartphone in the cavity 14 of the receiving device 13.

In one embodiment, the housing 15 of the receiving device 13 is provided with a wireless charging device for the smartphone, what is referred to as a wireless charging adapter (WCA). The WCA can have, for example, a WLC printed circuit board with a coil for wireless charging of the smartphone. The coil can be activated and supplied with power via the WLC printed circuit board.

A respective guide rail 25a, 25b (not illustrated specifically in FIG. 2) each having two guide grooves in accordance with DE 10 2013 202 932 A1 is formed in the upper protruding door panel section 10 and in the lower protruding door panel section 11, in which guide rail the receiving device 13 can be displaced together with the clamping device 17.

In the embodiment shown, in a change position 19 shown in FIG. 2, the clamping device 17 can be released from the receiving device 13 by means of a device which is not illustrated and, in the released state, can be displaced separately from the receiving device 13 in indicated guide rails 25a, 25b.

Figure 3:
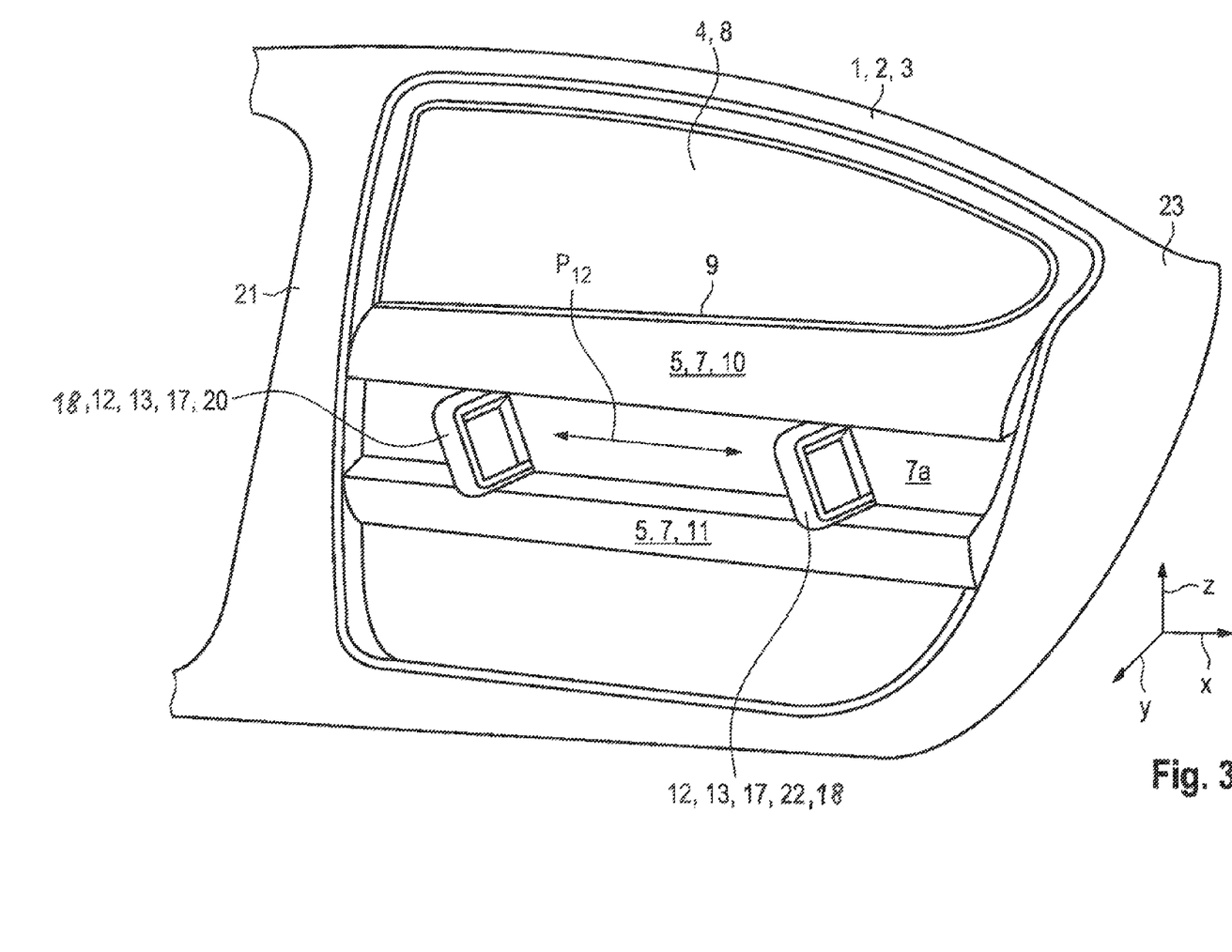
FIG. 3 is a perspective view corresponding to FIG. 1, wherein the holding device is illustrated in two possible end positions.

The receiving device 13 can be displaced together with the clamping device 17 in an interconnected clamping position 18, as is shown in FIG. 3. FIG. 3 illustrates a displacement of the holding device 12, consisting of the receiving device 13 and the clamping device 17 connected thereto, from a front position 20 level with a central bodywork pillar 21 of the bodywork 2 into a rear position 22 in the direction of a rear bodywork pillar 23 of the bodywork 2.

The two bodywork pillars 21 and 23 bound the door cutout opening 3 of the bodywork 2 substantially in a vertical z direction. The displaceability of the holding device 12 in the longitudinal direction x of the vehicle is illustrated symbolically by a double arrow $P_{12}$.

Figure 4:
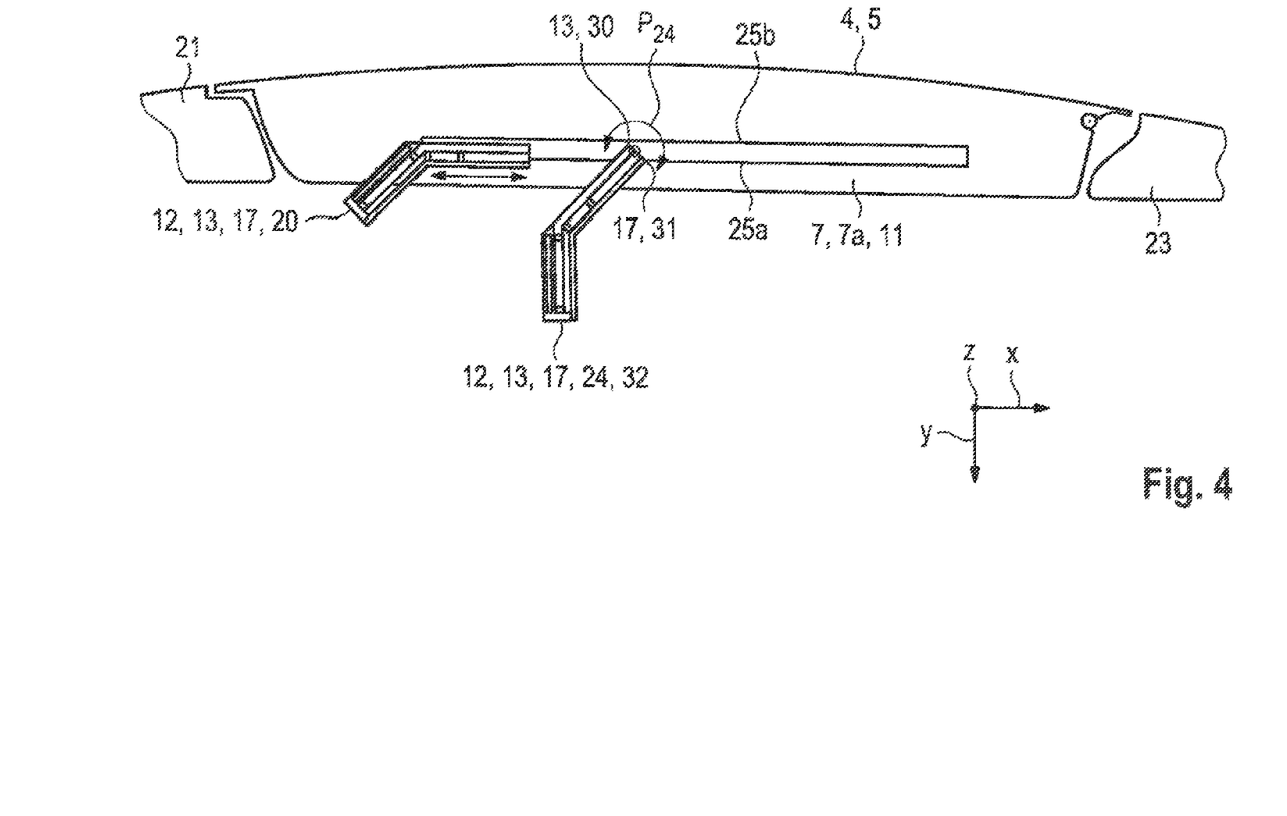
FIG. 4 is a sectional view corresponding to FIG. 2, wherein, when a vehicle door which is attached at the rear is closed, the holding device is moved from a front position into an intermediate position and, in the intermediate position, is pivoted into the vehicle interior.

FIG. 4 illustrates an embodiment of a holding device 12 which is reversibly pivotable in the transverse direction y of the vehicle from the position 20, 22 integrated in the door panel 7 into a position 24 spaced apart from the door panel 7. The pivotability is illustrated symbolically by a semicircular double arrow $P_{24}$. In FIG. 4, the holding device 12 is in an intermediate position 32 with respect to the longitudinal direction x of the vehicle and in the position 24, which is spaced apart from the door panel 7, with respect to the transverse direction y of the vehicle.

Figure 5:
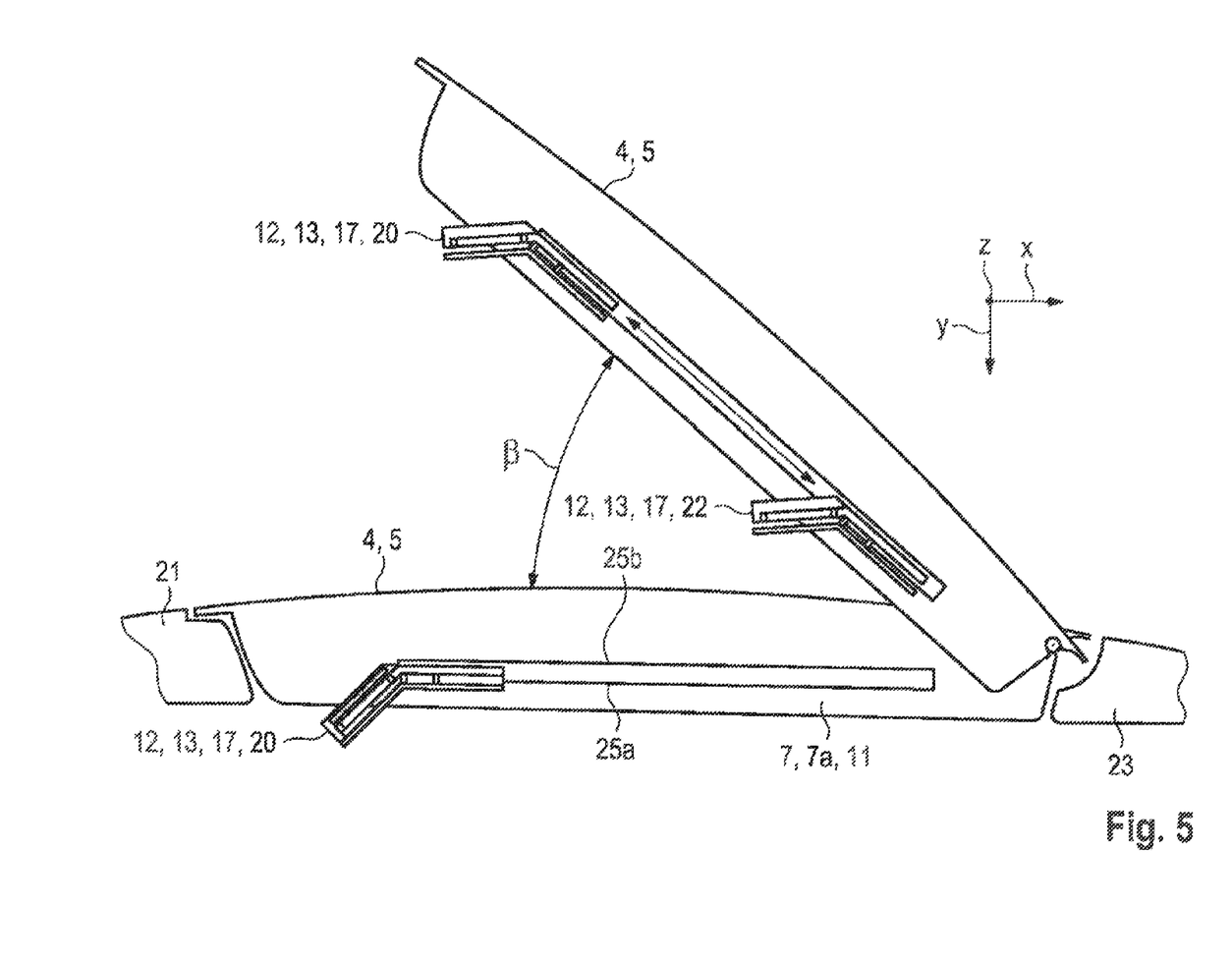
FIG. 5 shows the vehicle door, which is attached at the rear, in a closed state and additionally at a predetermined opening angle in an open, fixed state, wherein, when the vehicle door is closed, the holding device is in a front position, wherein, during the opening or closing of the vehicle door, the holding device moves via a drive from a rear position into the front position as an exit aid or from a front position into the rear position as an entry aid.

FIG. 5 shows an embodiment of the holding device 12 which is displaceable via a drive (not illustrated) from the front position 20 into any intermediate position 32 (shown in FIG. 4) lying in between as far as into a rear position 22 and back (in the longitudinal direction x of the vehicle when the vehicle door 4 is closed). The displacement of the holding device 12 via the drive (not illustrated) is also possible during the opening and the closing of the vehicle door 4 which is attached at the rear.

In the case of a vehicle door 4 which is illustrated in FIGS. 4 and 5 and is attached at the rear, the holding device acting as a door handle also acts as an entry aid or as an exit aid after the vehicle door 4 has been fixed in an open position via a door brake.

By means of the displacement movement of the holding device 12 via the drive (not illustrated) from the rear position 22 into the front position 20 and optionally a rotational movement of the holding device 12 acting as a door handle, the vehicle occupant on the seat is extricated from the sitting position.

In the same manner, as a person enters the motor vehicle 1 with an open vehicle door 4 fixed by the door brake and by the person firmly holding the holding device 12 which acts as a door handle and is displaced from the front position 20 into the rear position 22 via the drive (not illustrated) and optionally a rotational movement of the holding device 12, the entering person moves in an assisted manner into the sitting position. The operation of the holding device 12 reduces the muscle power required for entering or exiting and, for example, reduces the stress on the knees.

Before the assisting of the exit movement of a person on a seat adjacent to the vehicle door 4 by displacement of the holding device 12 from a front position 20 into a rear position 22, the door lock is unlocked by the vehicle occupant on the seat next to the vehicle door 4 via a mechanical or electrical door lock actuation formed on the holding device 12, for example in the form of a button.

Subsequently, the vehicle door 4 is opened manually or automatically via a drive (not illustrated) into a predetermined opening position of the vehicle door 4. When the predetermined opening position of the vehicle door 4 of the holding device 12 is reached, a door brake (not illustrated) locks the vehicle door 4 in the predetermined opening position.

In another embodiment, a door brake actuation, for example in the form of a button, is provided, by means of which the vehicle door 4 is secured in a desired opening position.

In the fixed position of the vehicle door 4 at the selected or predetermined opening angle, a force and a moment can be exerted on the vehicle door by the person exiting from the vehicle interior 6. By means of a motor-driven displacement of the holding device 12 from a front position 20 into a rear position 22, the person is extricated in an assisted manner from the vehicle interior 6.

In another embodiment, a pushbutton is provided on the holding device 12, said pushbutton both during the opening and during the closing of the vehicle door 4 permitting a combination of the actuation of the door brake and of the door lock unlocking or of the door lock locking.

In one embodiment in which mechanical door locking is provided, the combination of actuation of the door brake and door lock unlocking is triggered via a tilting lever which is formed on the housing 15 of the receiving device 13. By clasping the housing 15 with one hand, actuation by one hand is possible for the exit assistance by means of the displaceable holding device 12.

In order always to have an optimum access during the opening operation of the door and the closing operation of the vehicle door 4, the holding device 12 acting as a handle is mounted movably, that is to say in a translatory and/or rotatory manner, in the vehicle door 4.

The holding device 12 acting as a handle can be moved via a motor (not illustrated) into an optimum position which is dependent, for example, on the arm length of the occupant on the seat. The holding device 12 acting as a handle can be fixed in an optimum position when required in the opening movement of the vehicle door 4.

The holding device 12 acting as a door handle has a pivoting device which is movable by a drive device and by which the holding device 12 is reversibly pivotable from the position, determined by the guide rails 25a, 25b, in the door panel 7 into the position 24 pivoted into the vehicle interior 6.

The receiving device 13 and the clamping device 17 connected thereto are pivoted at a respective end 30, 31 (shown in FIG. 4) of the receiving device 13 and of the clamping device 17. The respective end 30, 31 is spaced apart from that section 26 of the receiving device 13 which faces the vehicle interior 6 or from the corresponding section 27 of the clamping device 17.

A side door 4 which is attached at the rear is provided with a control device which, during the opening of the side door 4 automatically or by manual actuation, brings about fixing of the side door 4 at a predetermined opening angle β via the present door brake.

A control device is provided which, automatically or by manual actuation on the holding device 12, brings about a translatory displacement of the holding device 12 in the direction of the guide rails 25a, 25b which are present from a front position 20 into a rear position 22, or vice versa, in the longitudinal direction x of the vehicle when the side door 4 is closed.

Furthermore, a control device is provided which, alternatively or additionally, brings about pivoting of the holding device 12 from the door-panel-side position 20, 22 into the pivoting position 24 of the holding device 12, said pivoting position facing the vehicle interior 6.

The actuation for unlocking or locking the door lock takes place electrically or mechanically.

An actuating device is provided on the holding device 12 in a handle position, said actuating device, by being actuated, bringing about unlocking of the door lock.

The drive for displacing and/or for pivoting the holding device 12 and/or for locking and unlocking the door lock and/or for retaining the door brake in the predetermined door opening position takes place mechanically, electrically and/or pneumatically.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle with at least one side door, comprising:
a door body of the side door which is provided with a door panel facing a vehicle interior, wherein a side window is lowerable into the door body and is provided above a door window sill of the door body;
a displaceable holding device comprising a receiving device and a clamping device connectable to the receiving device, wherein
the displaceable holding device is provided below the door window sill in an intermediate space between two protruding door panel sections of the door panel,
a housing of the receiving device serves simultaneously as a door handle and as the displaceable holding device, and
the housing of the receiving device has operating elements for locking and unlocking a door lock and/or operating elements for locking and unlocking a door brake of the side door.

2. The motor vehicle according to claim 1, further comprising:
a bodywork of the motor vehicle that contains at least one door cutout opening which is substantially bounded in a vertical direction by two bodywork pillars, wherein the side door is arranged in the respective door cutout opening.

3. The motor vehicle according to claim 1, wherein
the receiving device and the clamping device of the displaceable holding device are displaceable via guide rails in an upper door panel section and in a lower door panel section.

4. The motor vehicle according to claim 3, wherein
the receiving device has a section which protrudes into the vehicle interior at a predetermined inclination and has a section which is connected integrally thereto and is held in the guide rails.

5. The motor vehicle according to claim 4, wherein
the clamping device has a section protruding into the vehicle interior and a section guided in the guide rails,
the section of the clamping device which protrudes into the vehicle interior has the same inclination as the section of the receiving device which protrudes into the vehicle interior.

6. The motor vehicle according to claim 3, wherein
the holding device acting as the door handle is displaceable in a translatory manner in the direction of the guide rails by a drive device.

7. The motor vehicle according to claim 3, wherein
the holding device acting as the door handle has a pivoting device which is movable by a drive device and by which the holding device is reversibly pivotable from the position, determined by the guide rails, in the door panel into a position pivoted into the vehicle interior.

8. The motor vehicle according to claim 7, wherein
the pivoting of the receiving device and of the clamping device connected thereto takes place at a respective end of the receiving device and of the clamping device, which end is spaced apart from that section of the receiving device which faces the vehicle interior or from the corresponding section of the clamping device.

9. The motor vehicle according to claim 3, wherein
a control device is provided which, automatically or by manual actuation on the holding device, brings about a translatory displacement of the holding device in the direction of the guide rails which are present from a front position via intermediate positions into a rear position, or vice versa.

10. The motor vehicle according to claim 1, wherein
the side door, which is attached at the rear, is provided with a control device which, during the opening of the side door automatically or by manual actuation, brings about fixing of the side door at a predetermined opening angle via the door brake.

11. The motor vehicle according to claim 1, wherein
a control device is provided which brings about pivoting of the holding device from a door-panel-side position into a pivoting position of the holding device, said pivoting position facing the vehicle interior.

12. The motor vehicle according to claim 1, wherein
the actuation for unlocking or locking the door lock takes place electrically or mechanically.

13. The motor vehicle according to claim 1, wherein
an actuating device is provided on the holding device in a handle position, said actuating device, by being actuated, bringing about unlocking of the door lock.

14. The motor vehicle according to claim 1, wherein
the housing has a reinforced frame.

15. The motor vehicle according to claim 1, further comprising:
a drive for displacing and/or for pivoting the holding device, for locking and unlocking the door lock, and/or for retaining the door brake in a predetermined door opening position, wherein the drive is carried out mechanically, electrically and/or pneumatically.

* * * * *